E. A. HAND.
SLICING MACHINE.
APPLICATION FILED OCT. 31, 1910.

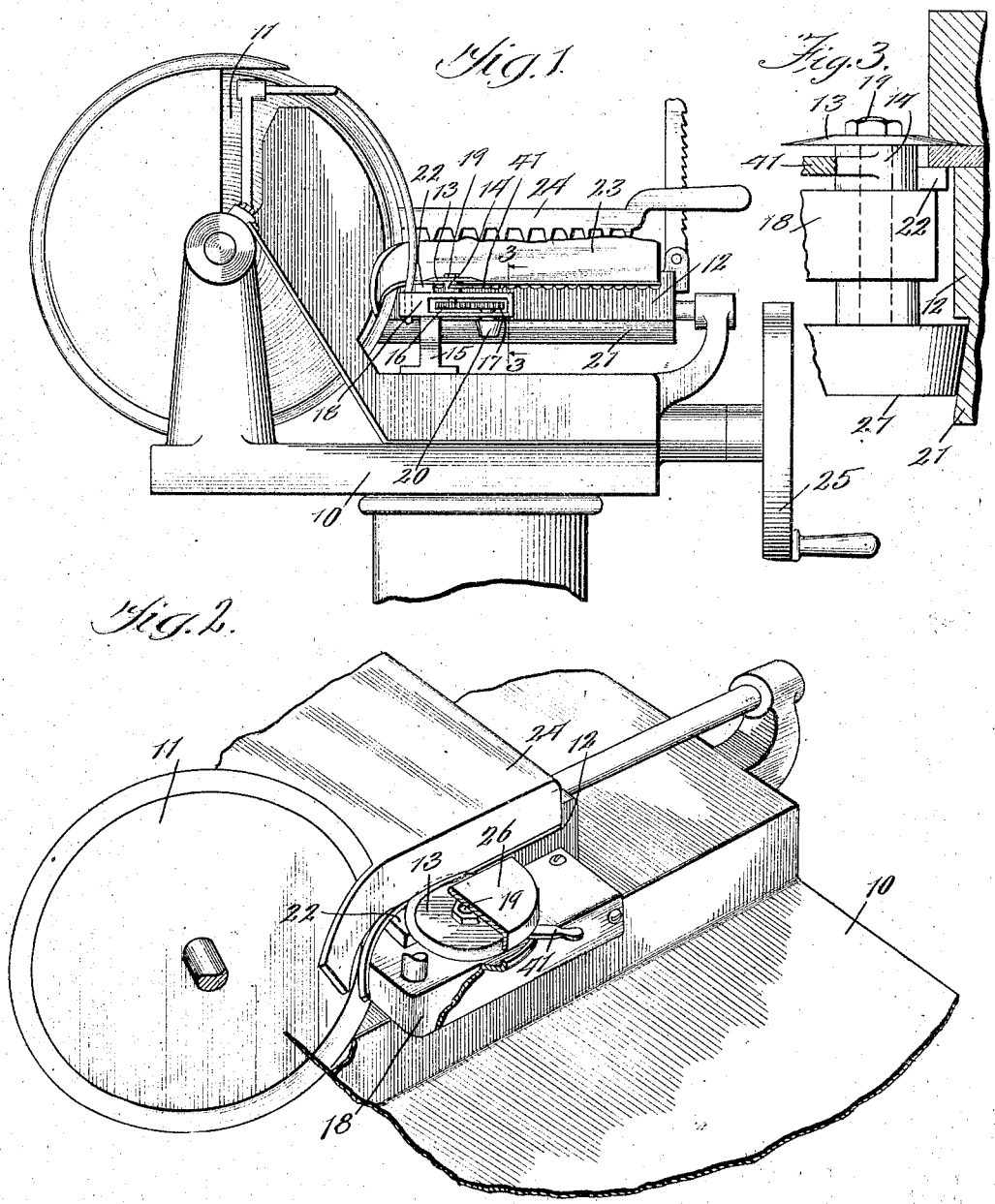

1,014,595.

Patented Jan. 9, 1912.

4 SHEETS—SHEET 2.

Witnesses:

Inventor
Enos Alfred Hand
by Brown & Hopkins
Attys.

E. A. HAND.
SLICING MACHINE.
APPLICATION FILED OCT. 31, 1910.
1,014,595.
Patented Jan. 9, 1912.
4 SHEETS—SHEET 3.
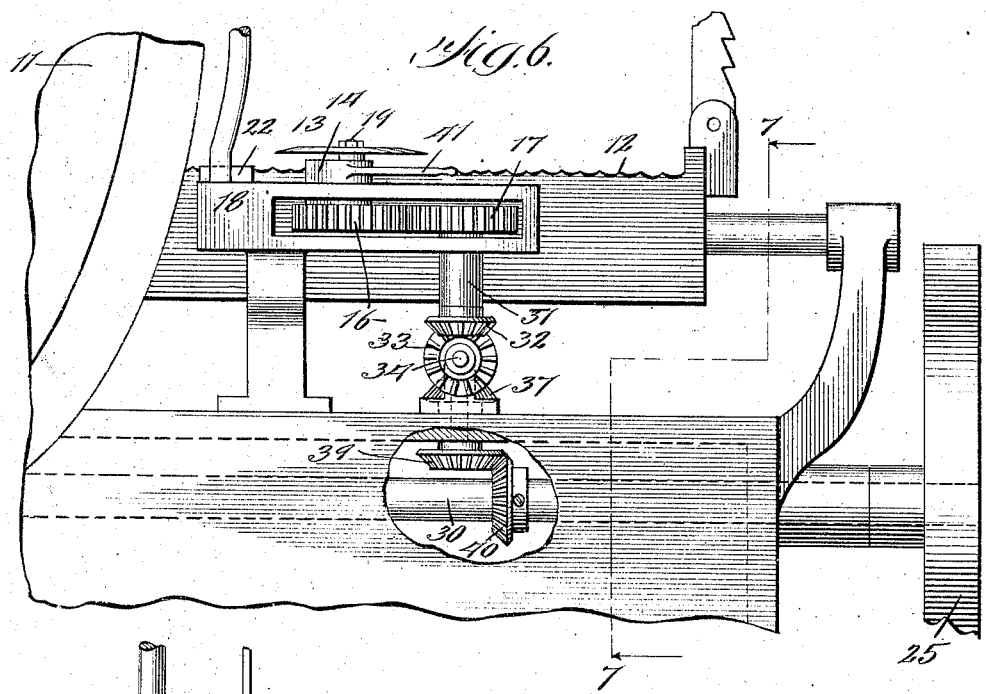
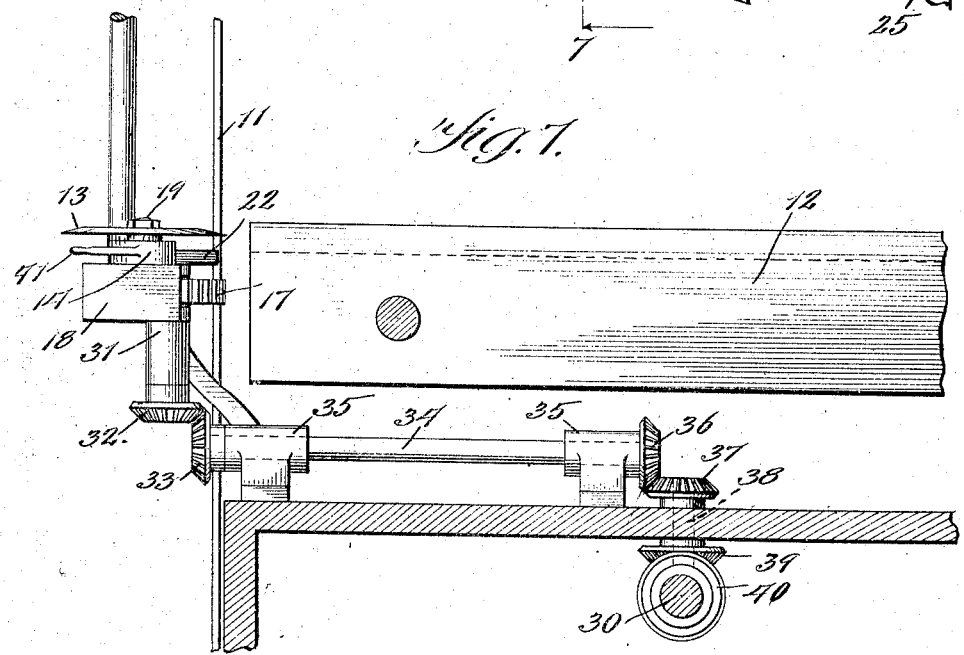

E. A. HAND.
SLICING MACHINE.
APPLICATION FILED OCT. 31, 1910.

1,014,595.

Patented Jan. 9, 1912.

4 SHEETS—SHEET 4.

Witnesses:

Inventor
Enos Alfred Hand
By Brown & Hopkins
Attys

UNITED STATES PATENT OFFICE.

ENOS ALFRED HAND, OF CHICAGO, ILLINOIS.

SLICING-MACHINE.

1,014,595.　　　　Specification of Letters Patent.　　Patented Jan. 9, 1912.

Application filed October 31, 1910.　Serial No. 589,916.

*To all whom it may concern:*

Be it known that I, ENOS ALFRED HAND, a subject of the King of England, residing at Chicago, in the county of Cook and State of Illinois, have invented certain new and useful Improvements in Slicing-Machines, of which the following is a specification.

This invention relates to slicing machines in general and more particularly to improvements in meat slicing machines and one of the objects of the invention is to provide improved means for automatically removing the rind or skin from meat, such as the side of a bacon, during the slicing process so that as each and every rasher or slice of bacon is cut the rind or skin will be simultaneously removed therefrom and the rasher or slice will leave the machine ready for cooking, thereby not only saving considerable time of the butcher but also resulting in considerable saving of meat to the customer, while at the same time the rind or skin is allowed to remain on the uncut portion of the meat to preserve the same.

A further object is to provide an improved cutter for removing the rind or skin and improved means whereby the cutter may be operated with respect to its support simultaneously with the operation of the slicing cutter and of the meat supporting carriage or platform.

A further object is to provide an improved machine of this character which will be simple, durable and cheap in construction, and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating the embodiment of the invention, and in which—

Figure 4:
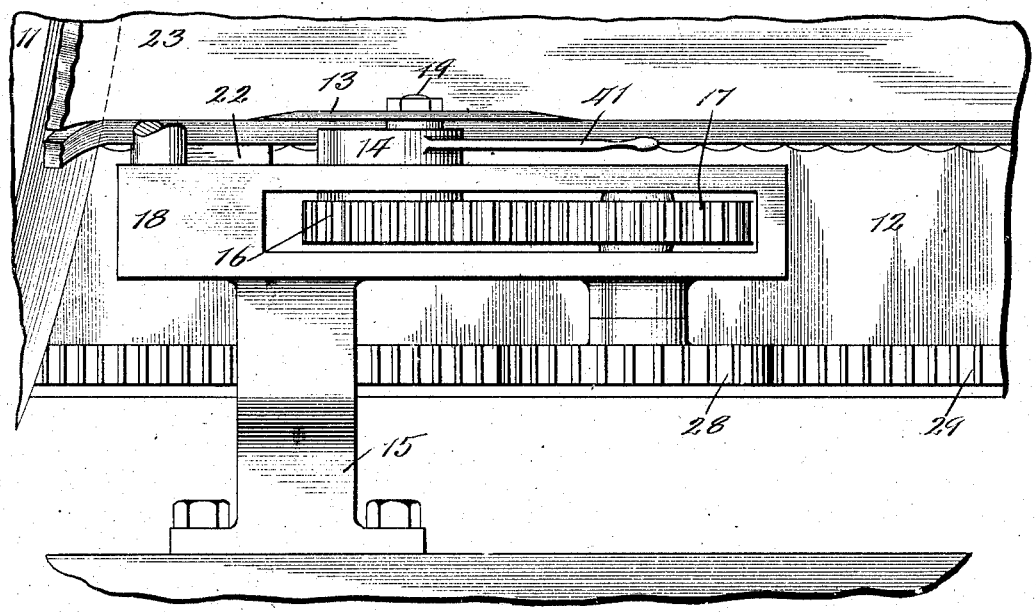
Figure 5:
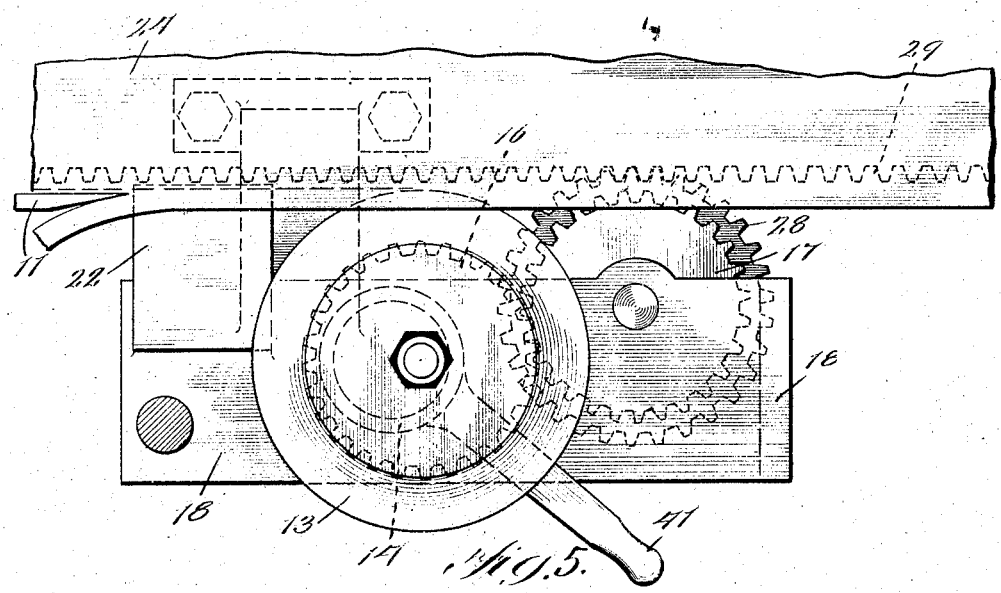
Figure 8:
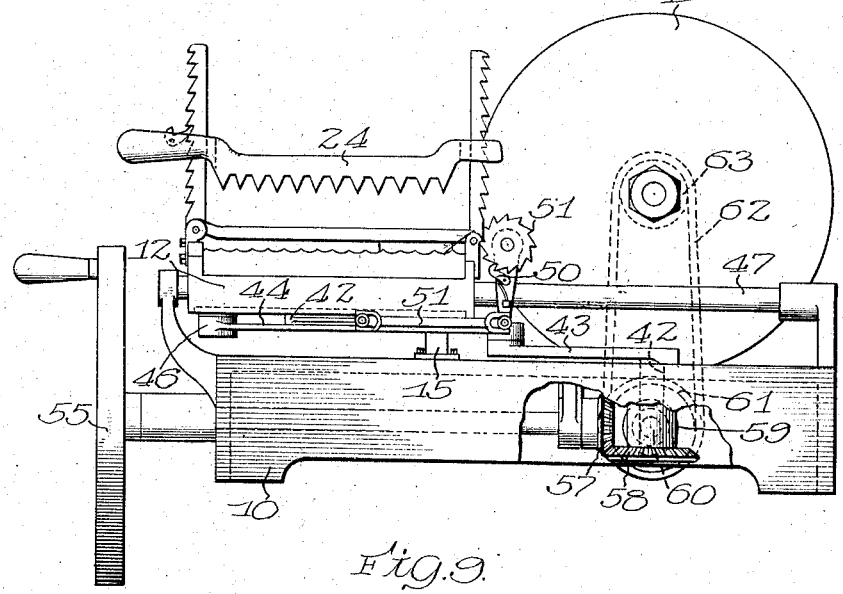
Figure 9:
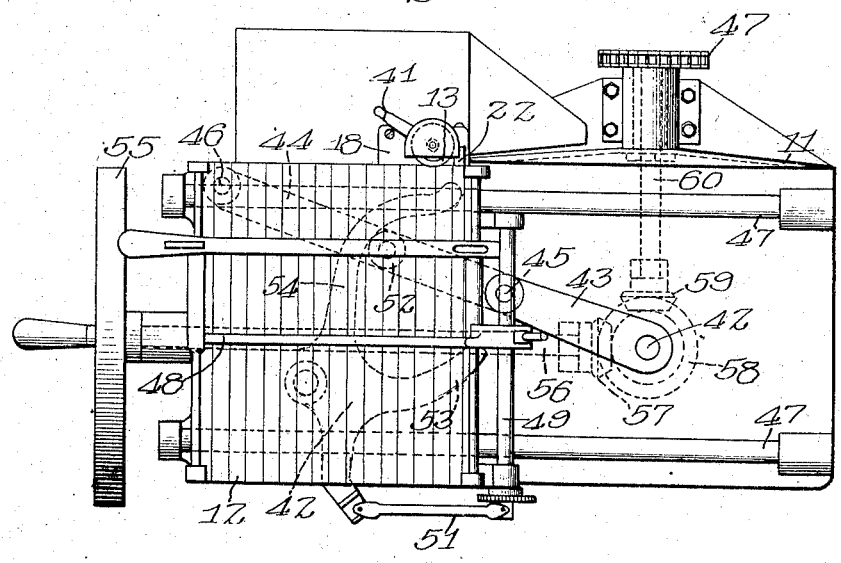

Figure 1 is a side elevation of a portion of a meat cutting machine, having an improved rind or skin removing means constructed in accordance with the principles of this invention and applied thereto. Fig. 2 is a detail perspective view of a portion of the machine with parts broken away. Fig. 3 is an enlarged detail view partly in elevation and partly in section, showing the modified form of a rind removing knife or cutter as taken on line 3—3 of Fig. 1. Fig. 4 is a detail side elevation of a portion of a meat cutting machine showing a modified form of attachment. Fig. 5 is a top plan view of Fig. 4. Fig. 6 is a detail view, similar to Fig. 1, of still another modified form of attachment of a rind cutting knife. Fig. 7 is a sectional view taken on line 7—7 of Fig. 6. Fig. 8 is a rear elevation partly in section, and Fig. 9 is a plan view of the machine.

Referring more particularly to the drawings, the numeral 10 designates generally the supporting structure of a meat slicing machine having the usual rotary slicing knife 11 and reciprocatory meat supporting table 12 which is coöperatively mounted with respect to the knife 11 in such a manner that a relative movement between the knife and table may be obtained. The table is preferably mounted for sliding movement with respect to the knife or cutter 11 with one edge thereof contiguous to the cutting plane of the knife. This table 12 is also adapted to be moved backwardly and forwardly from the right to the left in Fig. 1 for carrying the meat against the knife 11. Further mechanism is also provided for feeding the meat laterally across the table 12, the rate of such feed corresponding to the thickness of the rasher to be cut from the meat. All of the above described parts, however, may be of the ordinary and well known construction and constitute no part of the present invention.

Adjacent the lateral edge of the movable table 12 is a rotary cutter 13 which is arranged to rotate about an upright axis which axis is preferably arranged transversely with respect to the axis of rotation of the cutter 11. This cutter 13 may be of any desired configuration, but is preferably in the form of a disk, the axis of which is mounted in an eccentric bearing 14. The cutter 13 and bearing 14 are supported in position in any desired or suitable manner, preferably by means of a bracket 15 secured to any suitable stationary portion of the supporting frame 10. The knife or cutter 13 is preferably mounted so as to project over the upper face of the table 12 and is spaced from the upper face of the table a distance equal to the thickness of the rind or skin to be cut from the meat.

In the form of the invention shown in Figs. 1 and 2, the cutter 13 is adapted to be rotated by means of gears 16, 17 journaled in a suitable frame or housing 18. One of these gears is connected with the journal 19 of the cutter 13 and the other gear 17 is provided with a journal which extends beyond the supporting frame or housing 18. The projecting journal 20 of the gear 17 is preferably of a conical construction and depends below the gear in close proximity to a beveled or inclined portion 21 of the adjacent edge of the reciprocating table or platform 12 and has frictional engagement therewith. The inclined portion 21 of the table is preferably of a greater width than the width of the conical portion 20 of the gear bearing so that the portion 20 will always remain in frictional engagement with the portion 21 as the parts wear. A support 22 may be provided which is arranged in line with the upper face of the table or platform 12 and in close proximity to the portion of the cutting edge of the cutter 13 adjacent the cutting edge of the cutter 11 so as to support the cut portion of the meat at this point.

The meat 23 is placed on the table 12 in the ordinary and usual manner and is secured against accidental displacement by means of a gripping or clamping member 24 in the usual manner, so that when the operating wheel 25 is rotated in the ordinary and usual manner, the table 12 will be reciprocated toward and away from the cutting edge of the cutter 11 and at the same time the table 12 will be reciprocated with respect to the cutter 13. As the cutter 13 projects over and slightly above the upper face of the table 12, it will be apparent that as the table 12 advances, the rind or skin will be cut from the meat 23. In order to facilitate the cutting of the rind or skin, a rotary motion is imparted to the cutter 13 which is effected by means of the inclined or beveled face 21 of the table 12 having frictional engagement with the rotatable and conical portion 20 of the gear 17. As the table 12 advances, the gear 17 will be rotated which will in turn rotate the gear 16 and this gear will in turn rotate the cutter 13 so that a rotary motion will be imparted to the cutter 13 in a direction opposed to the direction of the advancing movement of the meat.

If desired, a shield 26 may be provided for the cutter 13.

In the form shown in Fig. 3, the conical member 27 which has frictional engagement with the inclined face 21 of the table 12 is mounted directly upon the axle 19 of the cutter 13, the object being in this form to rotate the cutter 13 in the same direction as the direction of movement of the table 12.

In the form of the invention shown in Figs. 4 and 5, the conical member or portion 20 on the axle of the gear 17 is dispensed with and in place thereof, there is provided a gear 28 and the front face of the table 12 is arranged in a substantially vertical plane throughout its edge and a rack 29 is secured to the front edge with which rack the gear 28 meshes, whereby a direct and positive drive mechanism is provided for the gear 17 instead of a frictional drive as in the forms shown in Figs. 1 to 3.

In the form of the invention shown in Figs. 6 and 7, the cutter 13 is driven from the main operating shaft 30 of the machine, which shaft imparts motion to the cutter 11 and the table 12 in the ordinary and well known manner. In order to accomplish this direct drive from the main driving mechanism, the gear 17 is provided with a shaft which is mounted in a suitable bearing 31 and a gear 32 is secured to the shaft. This gear 32 meshes with a companion gear 33 on the shaft 34 journaled in suitable bearings 35. Operative connection is obtained between the shaft 34 and the main driving shaft 30 of the machine through the medium of a gear 36 on the shaft 34 which meshes with a gear 37 on the stub shaft 38 and a gear 39 secured to the stub shaft 38 meshes with a gear 40 on the shaft 30. It will thus be seen that when the main shaft 30 is rotated, motion will be imparted to the gear 40 and this gear will in turn rotate the shaft 34 through the medium of the intermediate gears 39, 37, 36. The rotation of the shaft 34 will be imparted to the cutter 13 through the medium of the intermeshing gears 33, 32 and the gears 17, 16.

The cutter 13 is adapted to be moved into and out of operating positions by means of the eccentric bearing 14 and in order to accomplish this adjustment readily and quickly, a handle 41 is provided which is connected with the bearing 14, as shown more clearly in Fig. 5. When it is desired to throw the cutter 13 out of operating position, in all of the forms of the invention with the exception of that shown in Fig. 3, the handle 41 is adjusted so as to rotate the eccentric bearing and thereby move the cutter 13 bodily away from the table 12 so that it will not project over the front edge of the table. When the handle 41 is adjusted to throw the cutter 13 into an inoperative position, the gear 16 will be adjusted so that it will be moved out of mesh with the gear 17, as will be understood. The adjustment of the handle 41 in the form shown in Fig. 3, will cause the conical portion 27 of the axle 19 of the cutter 13 to be moved out of engagement with the inclined face 21 of the table 12 and the cutter 13 will be moved so that the active portion of its edge will not project over the edge of the table 12.

The meat supporting table 12 is provided with any suitable means for moving the same backwardly and forwardly from right to left and toward and away from the cutter 11, as shown in Figs. 8 and 9, the specific construction of which operating mechanism, forms no part of the present invention, but, as shown in these two figures, there is provided an upright shaft 42 which is journaled in the supporting structure 10 and is provided with a crank arm 43 to which a link 44 is pivotally connected by one end as at 45. The other end of the link is pivotally connected as at 46 to the plate or support 12 which is adapted to move on the guides 47 in the ordinary and usual manner so that when the shaft 42 is rotated, the crank arm 43 will be rotated and a relative movement between the table 12 and the knife or cutter 11, will be obtained. Mounted upon the table or support 12 is the usual follower 48, which is adapted to be advanced by means of a screw 49 with which the follower 48 has the usual connection. This screw 49 is rotated by means of the usual pawl and ratchet construction 50, 51, the pawl of which receives its motion from a cam or oscillating member 42$^x$ pivotally mounted to the table or support 12. One end of this cam or member 42$^x$ is connected to the pawl 50 by means of a link 51, and an anti-friction roller or projection 52 is provided on the link 44 so as to engage the arms 53, 54 of the cam or lever 42 to rock the latter about its pivot in one direction or the other according to the direction of movement of the support 12 to impart motion to the screw 49. The shaft 42 receives its motion from any source of power, such as a hand wheel 55 which is connected to a shaft 56, and this latter is in turn connected to the shaft 42 through the medium of the intermeshing gears 58, 58. The gear 58 also has meshing with it, another gear 59 which is connected to a shaft 60 on which shaft is secured a sprocket wheel 61. A support chain 62 passes over the sprocket wheel 61 and also a sprocket wheel 63 on the axle of the knife or cutter 11.

What is claimed as new is:

1. In a meat slicing machine, the combination of a support for the meat to be cut, a cutter, said cutter and support being relatively movable, a rind removing cutter the cutting edge of which operates in a plane intersecting the plane in which the cutting edge of the first recited cutter operates, and means for imparting a cutting motion to the second recited cutter.

2. In a meat slicing machine, the combination of a support for the meat to be cut, a cutter, said cutter and support being relatively movable, a rind removing cutter the cutting edge of which operates in a plane intersecting the plane in which the cutting edge of the first recited cutter operates, and means for imparting a cutting motion to the second recited cutter relative to the movement of the first recited cutter.

3. In a meat slicing machine, the combination of a relatively movable meat support and slicing cutter extending beyond the upper surface of the support, a rind removing cutter, a support for the latter, and means for imparting movement to the rind removing cutter relative to its support and during the cutting operation.

4. In a meat slicing machine, the combination of a relatively movable meat support and slicing cutter extending beyond the upper surface of the support, a cutter for removing the rind from the slices as they are cut, a support for the rind removing cutter, and means for imparting movement to the latter relative to its support and during its cutting operation.

5. In a meat slicing machine, the combination of a relatively movable meat support and slicing cutter extending beyond the upper surface of the support, a cutter for removing the rind from the individual slices separately and as they are cut, a support for the rind removing cutter, and means for imparting movement to the latter during its cutting operation and relative to its support and the first recited cutter.

6. In a meat slicing machine, the combination of a relatively movable meat support and slicing cutter extending beyond the upper surface of the support, a cutter for removing the rind from the individual slices separately and as they are cut, a support for the rind removing cutter, and means for imparting movement to the latter during its cutting operation and relative to its support and the first recited cutter, the cutting edges of the cutters operating in intersecting planes.

7. In a meat slicing machine, the combination of a support and a pivotally mounted slicing cutter extending beyond the upper surface of the support, said support and cutter being capable of a relative bodily movement, a second pivotally mounted cutter for removing the outer layer from the meat, and means for moving the last recited cutter about its pivot for cutting the meat.

8. In a meat slicing machine, the combination of a support and a pivotally mounted slicing cutter extending beyond the upper surface of the support, said support and cutter being capable of a relative bodily movement, a second pivotally mounted cutter for removing the outer layer from the meat, and means for moving the last recited cutter about its pivot for cutting the meat, the second recited cutter and the support being also capable of bodily relative movement.

9. In a meat slicing machine, the combination of a meat support and a pivotally supported slicing cutter extending beyond the upper surface of the support, said support and cutter being capable of bodily relative movement, means for moving the cutter about its pivot during such relative movement, a second cutter for removing the outer layer of the meat, a support upon which the latter cutter is mounted for pivotal movement, said second cutter and the first recited support being also capable of bodily relative movement, and means for moving the second cutter about its pivot during such relative movement.

10. In a meat slicing machine, the combination of a meat support and a pivotally supported slicing cutter extending beyond the upper surface of the support, said support and cutter being capable of bodily relative movement, means for moving the cutter about its pivot during such relative movement, a second cutter for removing the outer layer of the meat, a support upon which the latter cutter is mounted for pivotal movement, said second cutter and the first recited support being also capable of bodily relative movement, and means for moving the second cutter about its pivot during such relative movement, the active portions of the two cutters operating in intersecting planes.

11. In a meat slicing machine, the combination of a meat support, and a pivotally supported slicing cutter extending beyond the upper surface of the support, said support and cutter being capable of bodily relative movement, means for moving the cutter about its pivot during such relative movement, a rind removing cutter, a support upon which the latter is mounted for pivotal movement, said second cutter and the first recited support being also capable of bodily relative movement, and means for moving the second recited cutter about its pivot during such relative movement, the pivots of said cutters being arranged transversely with relation to each other.

12. In a meat slicing machine, the combination of a meat support and a pivotally supported slicing cutter extending beyond the upper surface of the support, said support and cutter being capable of bodily relative movement, means for moving the cutter about its pivot during such relative movement, a rind removing cutter, a support upon which the latter cutter is mounted for pivotal movement, said rind removing cutter and the first recited support being also capable of bodily relative movement, means for moving the last recited cutter about its pivot during such relative movement, and guards for the exposed edges of the cutters.

13. The combination of a relatively movable meat support and rotary slicing cutter extending beyond the upper surface of the support to remove the outer layer of the meat, and a second rotary cutter projecting over the lateral edge of the support, said second cutter and support being also relatively movable.

14. The combination of a relatively movable meat support and rotary slicing cutter extending beyond the upper surface of the support to remove the outer layer of the meat, and a second rotary cutter arranged transversely with respect to the first recited cutter and projecting over the lateral edge of the support, said second cutter and support being also relatively movable.

15. The combination of a relatively movable meat support and pivotally supported slicing cutter extending beyond the upper surface of the support to remove the outer layer of the meat, a second pivotally supported cutter arranged transversely with respect to the first said cutter and projecting over the lateral edges of the support, said second cutter and support being also relatively movable, and means for simultaneously moving the cutters about their respective pivots during their relative movements with respect to the said support.

16. The combination of a relatively movable meat support and pivotally supported slicing cutter extending beyond the upper surface of the support, a second pivotally supported cutter arranged with its cutting edge operating in a plane intersecting the plane in which the cutting edge of the first recited cutter operates and with its edge projecting over the lateral edge of the first said support to remove the outer layer of the meat, the second said cutter and the first said support being also relatively movable, and means whereby such relative movement will move the second recited cutter about its pivot.

17. The combination of a relatively movable meat support and pivotally supported slicing cutter extending beyond the upper surface of the support, a second pivotally supported cutter arranged with its cutting edge operating in a plane intersecting the plane in which the cutting edge of the first recited cutter operates and with its edge projecting over the lateral edge of the first said support to remove the outer layer of the meat, the second said cutter and the first said support being also relatively movable, and an operating connection between the second recited cutter and the said support whereby the relative movement thereof will move the cutter about its pivot.

18. The combination of a relatively movable meat support and pivotally supported slicing cutter extending beyond the upper surface of the support, a second pivotally supported cutter arranged with its cutting edge operating in a plane intersecting the plane in which the cutting edge of the first recited cutter operates and with its edge projecting over the lateral edge of the first said support to remove the outer layer of the meat, the second said cutter and the first said support being also relatively movable, an operating connection between the second recited cutter and the said support whereby the relative movement thereof will move the cutter about its pivot, and a guard for the last recited cutter.

19. In meat slicing machines, the combination of a relatively movable meat support, and a slicing cutter, means whereby such relative movement will cause the cutter to project beyond the upper surface of the support, a support, a second cutter movably mounted with respect to its support, said second cutter and the first recited support being also relatively movable, means whereby such relative movement will cause the second said cutter to project over the lateral edge of the first said support to remove the outer layer of the meat, and means whereby such relative movement will impart movement to the second said cutter with respect to its support.

20. In meat slicing machines, the combination of a relatively movable meat support, and a slicing cutter, means whereby such relative movement will cause the cutter to project beyond the upper surface of the support, a support, a second cutter movably mounted with respect to its support, said second cutter and the first recited support being also relatively movable, and means whereby such relative movement will cause the second said cutter to project over the lateral edge of the first said support to remove the outer layer of the meat, means whereby such relative movement will impart movement to the second said cutter with respect to its support and in a direction opposed to the direction of relative movement between the second said cutter and the first said support.

21. In meat slicing machines, the combination of a relatively movable meat support and a slicing cutter, means whereby such relative movement will cause the cutter to project beyond the upper surface of the support, a support, a second cutter movably mounted with respect to its support, said second cutter and the first recited support being also relatively movable, means whereby such relative movement will cause the second said cutter to project over the lateral edge of the first said support to remove the outer layer of the meat, means whereby such relative movement will impart movement to the second said cutter with respect to its support and in a direction opposed to the direction of relative movement between the second said cutter and the first said support, and means for rendering the second recited cutter inactive.

22. The combination of a relatively movable meat support and pivotally mounted slicing cutter extending beyond the upper surface of the support, a second pivotally mounted cutter projecting over the lateral edge of the support, said second cutter and support being also relatively movable, means whereby such relative movement will operate the second cutter about its pivot to remove the outer layer of the meat, and means for rendering the second said cutter inactive at will.

23. The combination of a relatively movable meat support and pivotally mounted slicing cutter extending beyond the upper surface of the support, a second pivotally mounted cutter projecting over the lateral edge of the support for removing the outer layer of the meat, said second cutter and support being also relatively movable, an operating connection between the second said cutter and the said support whereby such relative movement will move the former about its pivot, and means for rendering said connection inactive at will.

24. The combination of a relatively movable meat support and pivotally mounted slicing cutter extending beyond the upper surface of the support, a second pivotally mounted cutter projecting over the lateral edge of the support to remove the outer layer of the meat, said second cutter and support being also relatively movable, an operating connection between the second said cutter and the said support whereby such relative movement will move the former about its pivot, and means for rendering said connection inactive at will, the cutting edges of the two cutters operating in planes intersecting each other.

25. The combination of a relatively movable meat support and pivotally mounted slicing cutter extending beyond the upper surface of the support, a pivotally mounted rind removing cutter projecting over the lateral edge of the support, said rind removing cutter and support being also relatively movable, an operating connection between the second said cutter and the said support whereby such relative movement will move the former about its pivot, and means for rendering said connection inactive at will, the pivots of said cutters being arranged transversely with respect to each other.

26. The combination of a relatively movable meat support and pivotally mounted slicing cutter extending beyond the upper surface of the support, a pivotally mounted rind removing cutter projecting over the lateral edge of the support, said rind removing cutter and support being also relatively movable, an operating connection between the said support and the second said cutter whereby such relative movement will move the cutter about its pivot, and means for bodily shifting the latter to render the said connection inoperative.

27. The combination of a relatively movable meat support and pivotally mounted slicing cutter extending beyond the upper surface of the support, a pivotally mounted rind removing cutter projecting over the lateral edge of the support, said rind removing cutter and support being also relatively movable, an operating connection between the support and the rind removing cutter whereby such relative movement will move the last recited cutter about its pivot, an eccentric bearing for the rind removing cutter, and means for shifting said bearing to render the said connection inoperative.

28. The combination of a relatively movable meat support and pivotally mounted slicing cutter extending beyond the upper surface of the support, a pivotally mounted rind removing cutter projecting over the lateral edge of the support, said rind removing cutter and support being also relatively movable, an operating connection between the support and the rind removing cutter whereby such relative movement will move the latter about its pivot, an eccentric bearing for the rind removing cutter, and a handle for shifting the latter in its bearing to render the said connection inoperative.

In testimony whereof I have signed my name to this specification, in the presence of two subscribing witnesses, on this 28th day of October A. D. 1910.

ENOS ALFRED HAND.

Witnesses:
J. H. JOCHUM, Jr.,
CHARLES H. SEEM.